United States Patent Office 3,149,103
Patented Sept. 15, 1964

3,149,103
2-SUBSTITUTED-9-(3' - AMINOPROPYLIDENE)-
THIAXANTHENE AMINE EXCHANGE REACTION
Povl Viggo Petersen, Niels O. Lassen, and Torkil O. Holm, all of Copenhagen, Denmark, assignors to Kefalas, A/S, Copenhagen-Valby, Denmark
No Drawing. Filed July 7, 1960, Ser. No. 41,246
Claims priority, application Denmark July 14, 1959
3 Claims. (Cl. 260—240)

The present invention relates to thiaxanthenes of the general structural formula:

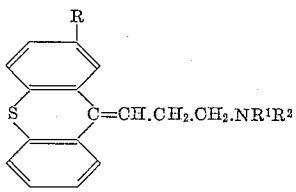

wherein R designates halogen or a methoxy group, and $R^1$ and $R^2$ each designates hydrogen or a lower-alkyl group, or wherein $R^1$ and $R^2$ together with the nitrogen atom represent the radical of a saturated five-membered or six-membered heterocyclic amine, as well as acid addition salts thereof.

The invention moreover relates to a particular amine exchange reaction for the preparation of compounds of Formula I, whereby a compound having the same general structural Formula I as given above is treated with an amine of the formula $H.NR^1R^2$, wherein $R^1$ and $R^2$ are as defined above and may or may not correspond to $R^1$ and $R^2$ in the starting thiaxanthene, to effect an exchange between the $—NR^1R^2$ group of the starting thiaxanthene and the $—NR^1R^2$ group of the amine reactant, whereupon the resulting thiaxanthene product of the Formula I may be isolated as the free base or in the form of an acid addition salt and, in the event said thus-produced thiaxanthene base or acid addition salt is a mixture of isomers, the individual isomers thereof may be isolated, if desired, by procedure already known for the separation and isolation of such isomers.

In the foregoing Formula I and elsewhere herein, the term lower-alkyl refers to an alkyl radical containing up to and including eight carbon atoms, and preferably no more than three carbon atoms, which may have either straight or branched chain structure, for example, methyl, ethyl, propyl, isopropyl, butyl, isobutyl, amyl, hexyl, heptyl, octyl, or the like.

As representative of Formula I radicals in which $R^1$ and $R^2$ together with the nitrogen atom represent a saturated five-membered or six-membered heterocyclic amine radical may be mentioned the pyrrolidine, piperidine, morpholine, thiamorpholine, piperazine, N'-lower-alkyl-piperazine, N'-hydroxy-lower-alkylpiperazine, C-methyl derivatives of the foregoing, and like radicals. The N'-hydroxy-lower-alkylpiperazine radicals may be represented by the partial formula: >N - lower - alkylene - OH, wherein the lower-alkylene radical is straight or branched and is a lower-alkyl radical minus one hydrogen atom and the hydroxy group may be primary, secondary or tertiary.

The compounds of Formula I, which on account of the asymmetric substitution of the phenyl rings of the thiaxanthene nucleus may exist as two geometric isomers of the cis-trans type, and of which numerous have been unknown before our invention or discovery thereof, distinguish themselves by possessing valuable pharmacodynamic properties. Thus they exert a pronounced depressant action on the central nervous system and have anti-emetic effect. In animal experiments the compounds show a strong sedative effect and are capable of depressing motor activity without having a simultaneous hypnotic effect. They further potentiate and prolong the action of barbiturates and analgesics and have a hypothermic effect. In addition, they exhibit a blood pressure depressing and spasmolytic effect and show a distinct anti-adrenaline effect. In animal experiments, the pharmacodynamic effects, which the compounds of the invention have in common with chlorpromazine, have in some cases proved to be considerably stronger than those produced by chlorpromazine. The compounds of the invention also show these effects similar to chlorpromazine clinically, and in those cases where the compounds of Formula I have been isolated as two separate geometric isomers, it has been proved that the isomers possess the said effects to a different degree. Thus it may be mentioned that the two isomeric 2-chloro-9-(3'-dimethylaminopropylidene)-thiaxanthenes show strongly differing effects, as one of the isomers, which in the form of its free base has a melting point of 97° centigrade, exhibits the abovementioned effects to a higher degree than the other isomer, which in the form of its free base has a melting point of 49° centigrade. The same holds true with regard to the isomers of 2-methoxy-9 - (3'-dimethylaminopropylidene)-thiaxanthene.

It is also to be emphasized that certain compounds which are conveniently produced according to the present invention are among those proved to have pharmacological effects considerably stronger than those produced by chlorpromazine. Thus it may be mentioned that, in experiments in mice, 9-[3'-(N'-hydroxy - lower - alkylpiperazine-N)-propylidene]-thiaxanthenes as represented, for example, by 2-chloro-9-[3'-(N'-β-hydroxyethylpiperazino-N)-propylidene]-β-thiaxanthene, e.g., in the form of its dihydrochloride, show a superior therapeutic index and a more pronounced ability to reduce motor activity than does chlorpromazine.

The method of the invention distinguishes itself in that, on the one hand it makes possible the preparation of valuable thiaxanthenes of Formula I, which are not accessible by known methods for the preparation of thiaxanthenes of similar structure, and on the other hand it makes possible the conversion of one geometric isomer of compounds falling within the scope of the general structural Formula I to the other isomer by treatment with an amine of the formula $H—NR^1R^2$, wherein $R^1$ and $R^2$ correspond to $R^1$ and $R^2$ in the starting thiaxanthene. Thus it has been found that if a particular compound having the general structural Formula I, which mainly or exclusively consists of one of its isomers, is treated in the manner of the present invention, a mixture of the geometric isomers of the compound is obtained, from which the other of the isomers may be isolated, for example by fractional crystallization of the free base or an acid addition salt thereof, whereupon if desired the remaining thiaxanthene isomer or isomer mixture may once more be subjected to the procedure. In this way it is possible to obtain a conversion of one of the isomers to the other in yields as high as ninety percent. This possibility for the conversion of one of the isomers to the other has great importance, as the individual isomers, as previously mentioned, differ substantially in their pharmacodynamic properties.

The provision of an amine exchange process for accomplishment of the foregoing indicated results, and the products produced thereby, are objects of the present invention. Additional objects of the invention will become apparent hereinafter.

Describing the process of the invention with greater particularity, in case the amine reactant $H—NR^1R^2$ employed in the amine exchange reaction has the same $R^1$ and $R^2$ groups as the starting thiaxanthene, then the resulting thiaxanthene product of Formula I will contain a different relative proportion of geometric isomers than the starting thiaxanthene. This result is of course most pronounced and significant where only, or substantially only, a single geometric isomer of the starting thiaxanthene is employed. In case the amine reactant H—NR$^1$R$^2$ employed in the amine exchange reaction has a different —NR$^1$R$^2$ group than the starting thiaxanthene, then the resulting thiaxanthene product of Formula I will have a different —NR$^1$R$^2$ group than the starting thiaxanthene, this group of the starting thiaxanthene being replaced in the amine exchange reaction by the —NR$^1$R$^2$ group of the amine reactant, provided only that the amine reactant either boils higher than the amine H—NR$^1$R$^2$ wherein R$^1$ and R$^2$ are the same as R$^1$ and R$^2$ in the starting thiaxanthene or, even though it does not boil higher than the amine H—NR$^1$R$^2$ wherein R$^1$ and R$^2$ correspond exactly to R$^1$ and R$^2$ in the starting thiaxanthene, if the amine reactant contains no more than one carbon atom less than such amine H—NR$^1$R$^2$ wherein R$^1$ and R$^2$ are the same as in the starting thiaxanthene.

Thus, the method of the invention consists essentially in the production of a thiaxanthene product of Formula I, or an acid addition salt thereof, by a process which comprises mixing and reacting a starting thiaxanthene, having the same general structural formula as Formula I above, with an amine of the formula H—NR$^1$R$^2$, wherein wherein R$^1$ and R$^2$ are as defined in Formula I, said amine being selected from (a) Amines wherein R$^1$ and R$^2$ are the same as in the starting thiaxanthene, (b) Amines wherein at least one of R$^1$ and R$^2$ is different than in the starting thiaxanthene and which boil higher than the amine H—NR$^1$R$^2$, wherein R$^1$ and R$^2$ are the same as in the starting thiaxanthene, and (c) Amines wherein at least one of R$^1$ and R$^2$ is different than in the starting thiaxanthene and which contain at most only one carbon atom less than the amine H—NR$^1$R$^2$ wherein R$^1$ and R$^2$ are the same as in the starting thiaxanthene, to produce a thiaxanthene product which contains a different relative proportion of geometric isomers than the starting thiaxanthene when the amine is as defined in (a), and to produce a thiaxanthene having a different —NR$^1$R$^2$ group than the starting thiaxanthene when the amine is as defined in (b) and (c).

In carrying out the method of the invention, it is preferred to employ a considerable excess of the amine reactant of the formula H—NR$^1$R$^2$ and in some cases it is convenient to utilize this amine reactant in a sufficient quantity to serve as solvent for the reaction. However, other inert solvents, such as ethanol, benzene, toluene, or the like, may be employed with equal facility.

The reactants are conveniently mixed together and their reaction assisted by the application of external heat in order to assure a reasonable time of reaction and satisfactory conversions. Advantageously, the temperature is at least 100 degrees centigrade and often higher. For the same reasons, and especially where the amine reactant is quite volatile, the reaction may be conducted under pressure as in an autoclave.

The time allowed for reaction may be varied considerably, but like temperature and other factors will have a substantial effect upon conversions and yields. Reaction periods of from twenty to forty-eight hours have been found entirely satisfactory with shorter and longer periods being utilizable, respectively resulting in somewhat lesser success as to conversions and yields and no appreciable improvement therein over those experienced using shorter reaction periods.

The starting thiaxanthenes are preferably dimethylamino compounds, or one specific isomer thereof in cases where inter-isomer transformations are desired, not only from the standpoint of importance and availability of these starting materials, but also from the standpoint of ease of operation and smoothness of reaction. When the starting thiaxanthene is a di-lower-alkylamino compound, alkyl groups containing up to and including three carbon atoms each are preferred, although others are operative. When replacement reactions are involved, that is, replacement of the —NR$^1$R$^2$ group of the starting thiaxanthene by a different —NR$^1$R$^2$ group, employment of a higher-boiling amine than H—NR$^1$R$^2$ in which R$^1$ and R$^2$ correspond with those of the starting thiaxanthene is definitely advantageous and preferred from the standpoint of higher yields and conversions as well as ease of operation.

An especially preferred replacement reaction involves the conversion of an —NR$^1$R$^2$ group in a starting thiaxanthene to a piperazinyl radical by reaction with a piperazine which has at least one secondary ring nitrogen atom, that is, at least one of the nitrogen atoms of the piperazine ring is attached to a hydrogen atom. Such reactions take place in high yields and conversions, whether the —NR$^1$R$^2$ group of the starting thiaxanthene is a dialkylamino or cyclic amino radical. Of the di-lower-alkyl radicals in the starting thiaxanthene, those having up to and including three carbon atoms each are preferred, especially dimethylamino, although other amine radicals may also be replaced with facility, especially by a higher boiling secondary piperazine such as piperazine itself, C - lower - alkylpiperazines, e.g., C - methylpiperazines; N-lower-alkylpiperazines, e.g., N-methylpiperazine or N-butylpiperazine; N - hydroxy - lower - alkylpiperazines, e.g., N-(beta-hydroxyethyl)-piperazine, N-(beta-hydroxypropyl)-piperazine, N-(delta-hydroxybutyl)-piperazine, or the like, and especially N-(beta-hydroxyethyl)-piperazine. Such reactions therefore represent a preferred embodiment of the process of the present invention.

Because the compounds of Formula I are asymmetrically substituted in the thiaxanthene ring system, they may be obtained from the reaction as a mixture of their cis and trans isomers. It is convenient to separate such mixtures into their individual isomers since as already stated these have often been found to differ with respect to their pharmacodynamic effects. For practical reasons, the isomers having the higher melting points as the free bases are called trans and those having the lower melting points are called cis isomers. The separation of the isomers is conveniently carried out by a fractional crystallization which in respect of the compounds of Formula I may be carried out on the free bases and on acid addition salts thereof as well, it usually being possible to find a solvent in which the solubilities of the isomers differ to a suitable extent.

Thus, for example, the compound of Formula I in which R designates a chlorine atom and each of R$^1$ and R$^2$ designates a methyl group, may be obtained as a mixture of isomers which can be separated from each other, for example, by crystallization of a mixture of the bases from petroleum ether, the trans form being more sparingly soluble in this solvent than the cis form.

It is noted that thiaxanthenes are often named in accordance with the nomenclature used in "Chemical Abstracts" prior to 1957, which nomenclature differs from that used herein in that the sulfur atom is the thiaxanthene ring system is designated by the number five and the carbon atom which connects the two benzene nuclei by the number ten.

For obvious reasons, when isolating any of the compounds of Formula I in the form of an acid addition salt, the acid is preferably selected so as to contain an anion which is non-toxic and pharmacologically acceptable, at least in usual therapeutic doses. Representative acid addition salts are hydrochlorides, hydrobromides, sulfates, phosphates, nitrates, acetates, lactates, maleates, citrates, tartrates and bitartrates, succinates, oxalates, methanesulfonates and ethanesulfonates. Other acid addition salts are likewise suitable and may be employed if desired. For example, fumaric, benzoic, ascorbic, salicylic, bismethylenesalicylic, propionic, gluconic, malic, malonic, mandelic, cinnamic, citraconic, stearic, palmitic, itaconic, glycolic, benzenesulfonic, and sulfamic acids may also be employed as acid addition salt-forming acids. While it is preferred to isolate the products from the process of the invention in the form of a solid or crystalline acid addition salt, if for any reason it is desired to obtain one of these amines in the form of its free base, this is ordinarily done according to conventional procedure, for example, by conducting the amine exchange reaction in a solvent and thereafter evaporating solvent to obtain the reaction product as a residue, usually an oil, or by dissolving the isolated hydrochloride or other salt in water, treating with a base such as ammonia, ammonium hydroxide, sodium carbonate or other suitable alkaline material, extracting the liberated base with a suitable solvent such as benzene, drying the extract, and evaporating to dryness in vacuo or fractionally distilling.

The starting thiaxanthenes can be prepared by various methods and, in the form of their acid addition salts, subjected to fractional crystallization to obtain individual geometric isomers, if desired. According to one method, a 2-substituted-9-(3'-aminopropyl)-thiaxanthydrol, as obtained by reacting the corresponding 2-substituted-thiaxanthydrol with acrylonitrile followed by a reduction under mild conditions, e.g., by means of lithium aluminum hydride or sodium borohydride, is reacted with a dehydrating agent such as an acid, for example, anhydrous hydrogen chloride, or an acid chloride, to yield a 2-substituted-9-(3'-aminopropylidene)-thiaxanthene, which is next reacted with an alkylating agent. Alternatively, said 2-substituted-9-(3'-aminopropyl)-thiaxanthydrol is treated with both a dehydrating and an alkylating agent, e.g., a mixture of formaldehyde and formic acid, in a single step.

Another method for the preparation of starting thiaxanthenes involves reaction of a 2-substituted-thiaxanthone with an allyl magnesium halide in ether, hydrolysis of the resulting Grignard complex to yield a 2-substituted-9-hydroxy-9-allyl-thiaxanthene, and reaction of this 2-substituted-9-hydroxy-9-allylthiaxanthene (or, 2-substituted-9-allylthiaxanthenol-9) with a dehydrating agent such as an acid or acid halide according to known procedure, if desired in the presence of a water-binding agent such as an anhydride, whereafter the reaction product [a 2-substituted-9-(propene-3-ylidene-1-)thiaxanthene] is reacted with an amine of the formula H—NR$^1$R$^2$, wherein R$^1$ and R$^2$ are as given above, whereupon the resulting thiaxanthene is isolated from the reaction mixture as the free base or in the form of an acid addition salt thereof. In the event said base or acid addition salt is a mixture of isomers, the individual isomers thereof may be isolated, if desired, by procedure already known for the separation and isolation of such isomers.

Starting thiaxanthenes having an N'-substituted piperazino ring may be prepared by reacting a 2-substituted-9-(propene-3-ylidene-1)-thiaxanthene with piperazine, whereafter the desired substituent may be introduced at the secondary nitrogen atom by treatment according to known alkylation procedure with an alkylating agent, such as methanolic formaldehyde in formic acid according to the classic Eschweiler-Clarke procedure, or such as a reactive alkyl or substituted alkyl ester, especially a hydroxyalkyl or acyloxyalkyl ester, for example, alkyl or substituted alkyl halides, e.g., bromides or iodides, alkyl or substituted alkyl surfates or sulfonates of the sodium or potassium alkyl sulfate or sulfonate type or of the dialkyl sulfate type, and the like, or by interaction with a lower-alkylene oxide such as ethylene, propylene, or butylene oxide according to conventional procedure for such alkylene oxide addition. Suitable alkylating agents, may for example, have the formula Q-lower-alkyl and Q-lower-alkylene-OH, wherein the lower-alkyl or lower-alkylene radical contains up to and including eight carbon atoms, and Q is the remainder of the reactive ester, such as a halogen atom or a sulfonic or sulfuric acid radical.

Certain of the starting thiaxanthenes and their preparation are disclosed in our U.S. applications Serial Nos. 802,023 and 802,043 of March 26, 1959, both now abandoned, and in Serial No. 856,353 of December 1, 1959.

The following examples are given by way if illustration only and are not to be construed as limiting.

EXAMPLE 1

2-Chloro-9-(3'-N-Piperazinylpropylidene)-Thiaxanthene and its Succinate

A mixture of 31.5 grams (0.1 mole) of the high-melting isomer (M.P. 97° centigrade) of 2-chloro-9-(3'-dimethylaminopropylidene)-thiaxanthene, 100 grams of anhydrous piperazine and ten milliliters of absolute ethanol is heated to 120–130° centigrade and maintained at this temperature under reflux for 24 hours. Dimethylamine evolves from the mixture during the entire period, but such evolution is practically complete after twenty hours. The reaction mixture is cooled and shaken with ether and water in a separatory funnel. The aqueous layer is discarded, and the ether phase washed once with water. Thereafter the ether phase is extracted with dilute acetic acid, and 2-chloro-9-(3'-N-piperazinylpropylidene)-thiaxanthene separated from the aqueous solution by addition of dilute sodium hydroxide solution to basic reaction. The free base is extracted with ether, the ether phase dried over potassium carbonate, and the succinate precipitated by neutralization of the ether phase with a solution of succinic acid in absolute ethanol. The succinate is recrystallized from absolute ethanol or water and is thereby obtained as a white, crystalline substance melting at 152–154° centigrade. The yield is 45–48 grams (90–95% of the theoretical).

EXAMPLE 2

2-Chloro-9-(3'-N-Piperazinylpropylidene)-Thiaxanthene and its Succinate

When Example 1 is carried out using the low-melting isomer of 2-chloro-9-(3'-dimethylaminopropylidene)-thiaxanthene (M.P. 49° centigrade) instead of the high-melting isomer, the succinate of 2-chloro-9-(3'-N-piperazinylpropylidene)-thiaxanthene, melting at 152–154° centigrade, is obtained in the same manner in a yield of 80% of the theoretical. This succinate is identical with the succinate from Example 1, as a mixture of the succinates showed no depression of the melting point, and infrared spectrography gave identical curves.

EXAMPLE 3

9-[3'-N-(N'-β-Hydroxyethyl)-Piperazinylpropylidene]-Thiaxanthenes and Their Dihydrochlorides A mixture of 31.5 grams (0.1 mole) of 2-chloro-9-(3'-dimethylaminopropylidene)-thiaxanthene (M.P. 97° centigrade) and 100 grams of N-(β-hydroxyethyl)-piperazine is heated to 130° centigrade and boiled under reflux at this temperature for 48 hours. After cooling, the excess of N-(β-hydroxyethyl)-piperazine is evaporated in vacuo, and the residue is dissolved in ether. The ether phase is washed with water and extracted with dilute acetic acid, and 2-chloro-9-[3'-N-(N'-β-hydroxyethyl)-piperazinylpropylidene]-thiaxanthene separated from the aqueous acetic acid solution by addition of dilute sodium hydroxide solution to basic reaction. The free base is extracted with ether, the ether phase dried over potassium carbonate, the ether evaporated and the residue dissolved in absolute ethanol. By complete neutralization of the ethanolic solution with a solution of dry hydrogen chloride in absolute ethanol, the dihydrochloride of 2-chloro-9-[3'-N-(N'-β-hydroxyethyl)-piperazinylpropylidene]-thiaxanthene is produced and crystallizes out as a white substance melting at ca. 250–260° centigrade with decomposition. The yield is 32 grams.

The same result is obtained when starting from the corresponding 2-unsubstituted or 2-methoxy, 2-bromo and 2-fluoro compounds instead of the 2-chloro-9-(3'-dimethylaminopropylidene)-thiaxanthene, and when starting from 2-chloro-9-(3'-dipropylaminopropylidene)- thiaxanthene, namely, production of the corresponding 9-[3'-N-(N'-β-hydroxyethyl)piperazinylpropylidene]-thiaxanthene compound.

EXAMPLE 4

*2-Chloro-9-[3'-N-(N'-β-Hydroxyalkyl)-Piperazinylpropylidene]-Thiaxanthenes and Their Dihydrochlorides*

When Example 3 is carried out using the same quantities of reactants, but employing instead of the high-melting isomer of 2-chloro-9-(3'-dimethylaminopropylidene)-thiaxanthene the low-melting isomer (M.P. 49° centigrade), the dihydrochloride of 2-chloro-9-[3'-N-(N'-β-hydroxyethyl)-piperazinylpropylidene]-thiaxanthene is obtained, which by determinations of melting point, including mixed melting point, and infrared spectrography proved to be identical with the dihydrochloride from Example 3.

Similarly, when Example 3 is carried out with the employment of N-(β-hydroxypropyl)-piperazine instead of the N-(β-hydroxyethyl)-piperazine, the corresponding 2-chloro-9-[3'-N-(N'-β-hydroxypropyl)-piperazinylpropylidene]-thiaxanthene is obtained.

EXAMPLE 5

*2-Chloro-9-[3'-N-(N'-Methyl)-Piperazinylpropylidene] Thiaxanthene and its Dihydrochloride*

When Examples 3 or 4 are carried out using 100 grams of N-methylpiperazine instead of N-β-hydroxyethylpiperazine, in both cases a dihydrochloride of 2-chloro-9-[3'-N-(N'-methyl)-piperazinylpropylidene]-thiaxanthene, melting at 250–260° centigrade with decomposition, is obtained, which by determinations of melting point, including mixed melting point, and infrared spectrography proved to be identical with each other.

EXAMPLE 6

*2-Chloro-9-(3'-N-Morpholinylpropylidene)-Thiaxanthene and Hydrohalides Thereof*

2-chloro-9-(3'-dimethylaminopropylidene)-thiaxanthene (31.5 grams), in the form of a mixture of the two isomers, and 100 milliliters of morpholine are heated together under reflux for 24 hours. Thereafter, the excess of morpholine is evaporated in vacuo, the residue dissolved in ether, and the ether solution washed with water and extracted with dilute acetic acid. Upon addition of dilute sodium hydroxide solution to the acetic acid solution, 2-chloro-9-(3'-N-morpholinylpropylidene)-thiaxanthene separates out and is extracted with ether. The ether solution is dried over potassium carbonate and evaporated, the residue dissolved in acetone, and the acetone solution neutralized by a solution of dry hydrogen chloride in acetone. Thereupon a hydrochloride of 2-chloro-9-(3'-N-morpholinylpropylidene)-thiaxanthene crystallizes out as a white, crystalline substance melting at 209–211° centigrade. This hydrochloride represents one of the possible isomers.

The mother liquor obtained from the crystallization of this hydrochloride is evaporated on a steam bath, and the residue is dissolved in water. By neutralization of the aqueous solution with dilute sodium hydroxide solution, an oily base is separated out and this is extracted with ether. The ether solution is dried over potassium carbonate, whereupon the hydrobromide of 2-chloro-9-(3'-N-morpholinylpropylidene)-thiaxanthene is precipitated by neutralization with a solution of hydrogen bromide in ethanol. After recrystallization from ethanol, this hydrobromide melts at 178–180° centigrade. The yield is three grams. This hydrobromide represents the other of the possible isomers.

Upon conversion of the hydrochloride melting at 209–211° centigrade to the corresponding hydrobromide, a hydrobromide melting at 217–218° centigrade is obtained and found to be less soluble in acetone and ethanol than the hydrobromide of the other isomer.

EXAMPLE 7

*2-Chloro-9-(3'-N-Piperidinylpropylidene)-Thiaxanthene and Salts Thereof*

2-chloro-9-(3'-dimethylaminopropylidene)-thiaxanthene (31.5 grams), in the form of a mixture of the two isomers, and 100 milliliters of piperidine are heated together under reflux for 24 hours. Thereafter, the excess of piperidine is evaporated in vacuo, the residue dissolved in ether, and the ether solution washed with water and extracted with dilute acetic acid. By neutralization of the acetic acid solution with dilute sodium hydroxide solution, 2-chloro-9-(3'-N-piperidinylpropylidene)-thiaxanthene is separated out and is extracted with ether. The ether phase is dried over potassium carbonate and evaporated, and the residue dissolved in 100 milliliters of ethanol. The ethanol solution is neutralized with a solution of hydrogen chloride in ethanol, and a hydrochloride only sparingly soluble in ethanol crystallizes out. This hydrochloride represents one of the isomeric 2-chloro-9-(3'-N-piperidinylpropylidene)-thiaxanthenes and melts after recrystallization from ethanol at 260–270° centigrade with decomposition. The yield is 25 grams.

The corresponding hydrosulphate crystallizes from ethanol and melts at 190–192° centigrade.

The mother liquor, from the crystallization of the hydrochloride which is sparingly soluble in ethanol, is evaporated and the residue dissolved in water, whereafter the aqueous solution is neutralized by dilute sodium hydroxide solution. The base which separates is extracted with ether, the ether phase dried and evaporated, and the residue dissolved in twenty milliliters of ethanol. The ethanol solution is neutralized with a solution of concentrated sulphuric acid in ether, whereupon a hydrosulphate precipitates. After repeated recrystallization from ethanol, this hydrosulphate melts at 205–208° centigrade. The yield is 2.4 grams. This hydrosulphate represents the other isomer of 2-chloro-9-(3'-N-piperidinylpropylidene)-thiaxanthene.

EXAMPLE 8

*2-Chloro-9-(3'-Dimethylaminopropylidene)-Thiaxanthene Inter-Isomer Transformations*

A mixture of 31.5 grams of the low-melting isomer of 2-chloro-9-(3'-dimethylaminopropylidene)-thiaxanthene (M.P. 49° centigrade) and 100 milliliters of anhydrous dimethylamine is heated in an autoclave at 140° centigrade for twenty hours. Thereafter, dimethylamine is evaporated and the residue dissolved in boiling petroleum ether. Upon cooling, 8.5 grams of the high-melting isomer crystallizes out, which after recrystallization from ethanol has the melting point 97° centigrade.

Upon correspondingly treating 31.5 grams of the high-melting isomer of 2-chloro-9-(3'-dimethylaminopropylidene)-thiaxanthene (M.P. 97° centigrade), 13.5 grams of the high-melting isomer is obtained by crystallization from petroleum ether. By evaporating of the mother liquor, 15 grams of the low-melting isomer (M.P. 49° centigrade) is obtained.

EXAMPLE 9

*2-Chloro-9-(3'-N-Pyrrolidinylpropylidene)-Thiaxanthene and Salts Thereof*

A mixture of 31.5 grams (0.1 mole) of 2-chloro-9-(3'-dimethylaminopropylidene)-thiaxanthene (M.P. 97° centigrade) and seventy milliliters of pyrrolidine is heated in an autoclave at 140° centigrade for 24 hours. Thereafter, excess pyrrolidine is distilled off in vacuo, the residue dissolved in ether, and the ether solution extracted with dilute acetic acid. By adding dilute sodium hydroxide solution to the acetic acid soluton to basic reaction, the base is separated out and is thereafter extracted with ether. The ether solution is dried over potassium carbonate and the ether evaporated. The residue is dissolved in 100 milliliters of absolute ethanol, and the ethanol solution neutralized with a solution of dry hydrogen chloride in ethanol. Thereby twenty grams of a hydrochloride of 2 - chloro - 9 - (3'-N-pyrrolidinylpropylidene)-thiaxanthene, which is rather sparingly soluble in water and melts at 244–248° centigrade with decomposition, crystallizes out. The corresponding base liquifies upon drying. The corresponding sulphate crystallizes from ethanol (M.P. 151–152° centigrade) and is, unlike the hydrochloride, readily soluble in water. The said base and the corresponding hydrochloride and sulphate represent one of the possible geometric isomers.

By evaporation of the mother liquor from the crystallization of the hydrochloride to about thirty milliliters and addition of the same volume of ether, seven grams of a hydrochloride of 2-chloro-9-(3'-N-pyrrolidinylpropylidene)-thiaxanthene, which is readily soluble in ethanol and which after recrystallization from water melts at 180–182° centigrade, is obtained. The base corresponding to this hydrochloride crystallizes from ether or petroleum ether and melts at 85–86° centigrade. The corresponding sulphate crystallizes from ethanol, melts at 176–178° centigrade, and is readily soluble in water. The said base melting at 85–86° centigrade and the corresponding hydrochloride and sulphate represent the other of the possible isomers of 2-chloro-9-(3'-N-pyrrolidinylpropylidene)-thiaxanthene.

EXAMPLE 10

*2-Chloro-9-(3'-Methylaminopropylidene)-Thiaxanthene and the Hydrochloride Thereof*

When carrying out the procedure of Example 9 but using forty grams of methylamine instead of seventy milliliters of pyrrolidine, 2-chloro-9-(3'-methylaminopropylidene)-thiaxanthene is obtained as a colorless syrup. The corresponding hydrochloride is obtained, after recrystallization from ethanol or water and drying at 100° centigrade, as a white crystalline substance which melts at 185–187° centigrade.

EXAMPLE 11

*2-Methoxy-9-[3'-N-(N'-Methyl)-Piperazinylpropylidene]Thiaxanthene and the Maleate Thereof*

A mixture of 31 grams of the high-melting isomer of 2-methoxy - 9 - (3' - dimethylaminopropylidene) - thiaxanthene (M.P. 76–77° centigrade) and sixty grams of N-methylpiperazine is heated under reflux at 130° centigrade for 24 hours. After cooling, the excess of N-methylpiperazine is distilled off in vacuo and the residue dissolved in ether. The ether phase is washed with water, shaken with dilute acetic acid, and 2-methoxy-9-[3'-N-(N'-methyl)-piperazinylpropylidene]-thiaxanthene is precipitated from the aqueous acetic acid solution by addition of dilute sodium hydroxide solution to basic reaction. The free base is extracted with ether, the ether phase dried over potassium carbonate, and the ether evaporated, whereupon the base is obtained as a colorless syrup. The corresponding maleate crystallizes from ethanol and melts after recrystallization from water, in which it is sparingly soluble, at 190–200° centigrade with decomposition.

EXAMPLE 12

*2-Methoxy-9-(3'-Dimethylaminopropylidene)-Thiaxanthene Inter-Isomer Transformations*

A mixture of 31 grams (0.1 mole) of the crystalline isomer of 2-methoxy - 9 - (3'-dimethylaminopropylidene)-thiaxanthene (M.P. 77° centigrade) and 100 milliliters of anhydrous dimethylamine is heated in an autoclave at 140° centigrade for twenty hours. Excess dimethylamine is evaporated and the residue dissolved in warm petroleum ether. By cooling and seeding, fifteen grams of the crystalline isomer (M.P. 77° centigrade) crystallizes out. The petroleum ether is evaporated from the mother liquor and the residue dissolved in fifty milliliters of absolute ethanol. The ethanol solution is neutralized with a solution of hydrogen chloride in ethanol. Thereupon eleven grams of the hydrochloride (M.P. 180° centigrade) of the other isomer of 2-methoxy-9-(3'-dimethylaminopropylidene)-thiaxanthene crystallizes out. The corresponding free base does not crystallize.

When, in the same manner, 31 grams of the noncrystalline isomer of 2-methoxy-9-(3'-dimethylaminopropylidene)-thiaxanthene is treated with anhydrous dimethylamine, 9.5 grams of the crystalline isomer (M.P. 77° centigrade) are isolated from the reaction product by crystallization from petroleum ether.

EXAMPLE 13

*2-Bromo-9-(3'-Dimethylaminopropylidene)-Thiaxanthene and Other Inter-Isomer Transformations*

Forty grams (0.1 mole) of the low-melting isomer of 2 - bromo - 9 - (3' - dimethylaminopropylidene) - thiaxanthene (M.P. 58–60° centigrade) are heated for 48 hours in an autoclave at 140° centigrade with 100 milliliters of anhydrous dimethylamine. After evaporation of dimethylamine, the residue is dissolved in a mixture of twenty milliliters of ether and eighty milliliters of petroleum ether. Upon cooling, sixteen grams of the high-melting isomer of 2-bromo-9-(3'-dimethylaminopropylidene)-thiaxanthene, melting at 89–92° centigrade, crystallizes out. After recrystallization from ethanol the said isomer, melting at 92–94° centigrade, is obtained in a yield of thirteen grams.

From the mother liquor from the first crystallization, ether and petroleum ether are evaporated on a steam bath and the residue is dissolved in fifty milliliters of methanol. By cooling, 21 grams of the low-melting isomer of 2 - bromo - 9 - (3' - dimethylaminopropylidene)-thiaxanthene, melting at 57–60° centigrade, is crystallized out.

In the same manner, when the 2-substituent is methoxy, chloro, bromo or fluoro, and the —NR$^1$R$^2$ substituent of the starting thiaxanthene is methylamino, diethylamino, dipropylamino, pyrrolidino, piperidino, or morpholino, heating of the starting thiaxanthene compound together with the amine H—NR$^1$R$^2$ wherein R$^1$ and R$^2$ are the same as in the starting thiaxanthene, results in an inter-isomer transformation and production of a thiaxanthene product having a different relative proportion of geometric isomers than the starting thiaxanthene, or conversion to the other isomer when the starting thiaxanthene is only one, or substantially only one, of the possible isomers. The reaction product in any event may be worked up as indicated in the foregoing Example 13 and elsewhere in this specification, and the free base or an acid addition salt of the desired isomer or the mixture of isomers separated according to known procedure.

EXAMPLE 14

*2-Chloro-9-(3'-N-Piperazinylpropylidene)-Thiaxanthene and Salts Thereof*

In the same manner as given in Example 1, but using 2 - chloro - 9 - (3' - N - pyrrolidinylpropylidene) - thiaxanthene instead of the 2-chloro-9-(3'-dimethylaminopropylidene)-thiaxanthene employed in Example 1, the compound 2 - chloro - 9 - (3' - N - piperazinylpropylidene)-thiaxanthene is prepared and separated as the free base, or, if desired, as an acid addition salt, e.g., the succinate, thereof by neutralization of a slightly basic solvent solution of the free base with the selected acid, e.g., succinic acid.

EXAMPLE 15

*2-Chloro-9-(3'-N-Piperazinylpropylidene)-Thiaxanthene and Salts Thereof*

In the same manner as given in Example 1, but using 2 - chloro - 9 - (3' - N - piperidinylpropylidene) - thiaxanthene instead of the 2-chloro-9-(3'-dimethylaminopropylidene)-thiaxanthene employed in Example 1, the compound 2 - chloro - 9 - (3' - N - piperazinylpropylidene)-thiaxanthene is prepared and separated as the free base, or, if desired, as an acid addition salt, e.g., the succinate, thereof by neutralization of a slightly basic solvent solution of the free base with the selected acid, e.g., succinic acid.

EXAMPLE 16

*2-Chloro-9-(3'-N-Piperazinylpropylidene)-Thiaxanthene and Salts Thereof*

In the same manner as given in Example 1, but using 2 - chloro - 9 - (3' - N - morpholinylpropylidene) - thiaxanthene instead of the 2-chloro-9-(3'-dimethylaminopropylidene)-thiaxanthene employed in Example 1, the compound 2 - chloro - 9 - (3' - N - piperazinylpropylidene)-thiaxanthene is prepared and separated as the free base, or, if desired, as an acid addition salt, e.g., the succinate, thereof by neutralization of a slightly basic solvent solution of the free base with the selected acid, e.g., succinic acid.

EXAMPLE 17

*2-Halo-9-(3'-N-Piperazinylpropylidene)-Thiaxanthene and Salts Thereof*

In the same manner as given in Example 1, but using 2 - chloro - 9 - (3' - dipropylaminopropylidene) - thiaxanthene instead of the 2-chloro-9-(3'-dimethylaminopropylidene)-thiaxanthene employed in Example 1, the compound 2 - chloro - 9 - (3' - piperazinylpropylidene)-thiaxanthene is prepared and separated as the free base, or, if desired, as an acid addition salt, e.g., the succinate, thereof by neutralization of a slightly basic solvent solution of the free base with the selected acid, e.g., succinic acid.

The same result is produced using the corresponding 2-bromo or 2-fluoro compound instead of the starting 2-chloro-9-(3'-dipropylaminopropylidene)-thiaxanthene.

EXAMPLE 18

*2-Chloro-9-(3'-N-Piperazinylpropylidene)-Thiaxanthene and Salts Thereof*

In the same manner as given in Example 1, but using 2 - chloro - 9 - (3' - diethylaminopropylidene) - thiaxanthene instead of the 2-chloro-9-(3'-dimethylaminopropylidene)-thiaxanthene, the compound 2-chloro-9-(3'-N-piperazinylpropylidene)-thiaxanthene is prepared and separated as the free base, or, if desired, as an acid addition salt, e.g., the succinate, thereof by neutralization of a slightly basic solvent solution of the free base with the selected acid, e.g., succinic acid.

EXAMPLE 19

*2-Chloro-9-(3'-Ethylaminopropylidene)-Thiaxanthene and Hydrochlorides Thereof*

In the same manner as given in Examples 9 and 10, but employing forty grams of ethylamine instead of the seventy milliliters of pyrrolidine used in Example 9, the compound 2-chloro-9-(3'-ethylaminopropylidene)-thiaxanthene is obtained as a colorless syrup. The corresponding hydrochloride is obtained as a mixture of isomers having a melting range between about 190 and 210° C. in moderate yield. The respective hydrochlorides are obtained, after recrystallization from ethanol or water and drying at 100° C., as white crystalline substances.

Various modifications may be made in the products and process of the present invention without departing from the spirit and scope thereof, and it is to be understood that the invention is limited only by the scope of the appended claims.

We claim:

1. A process for the production of 9-[3'-N-(N'-hydroxy - lower - alkyl)-piperazinylpropylidene]-thiaxanthenes from a 9-(3'-di-lower-alkylaminopropylidene)-thiaxanthene which comprises heating said starting di-lower-alkylaminothiaxanthene compound together with an excess of N-(hydroxy-lower-alkyl)-piperazine which boils higher than the amine H—$NR^1R^2$, wherein $R^1$ and $R^2$ are the same as the lower-alkyl groups of the starting di-lower-alkylamino thiaxanthene compound, at a temperature above 100° centigrade to cause conversion of said starting di-lower-alkylamino thiaxanthene compound to the desired 9 - [3' - N-(N'-hydroxy-lower-alkyl)-piperazinylpropylidene]-thiaxanthene.

2. A process for the production of 2-halo-9-[3'-N-(N'-hydroxy - lower - alkyl)-piperazinylpropylidene]-thiaxanthenes from a 2-halo-9-(3'-di-lower-alkylaminopropylidene)-thiaxanthene which comprises heating said starting di-lower-alkylamino thiaxanthene compound together with an excess of N-(hydroxy-lower-alkyl)-piperazine which boils higher than the amine H—$NR^1R^2$, wherein $R^1$ and $R^2$ are the same as the lower-alkyl groups of the starting di-lower-alkylamino thiaxanthene compound, at a temperature above 100° centigrade to cause conversion of said starting di-lower-alkylaminothiaxanthene compound to the desired 2-halo-9-[3'-N-(N-hydroxy-lower-alkyl)-piperazinylpropylidene]-thiaxanthene.

3. A process for the production of 2-chloro-9-[3'-N-(N' - β - hydroxyethyl)-piperazinylpropylidene]-thiaxanthene from 2-chloro-9-(3'-dimethylaminopropylidene)-thiaxanthene which comprises heating said starting dimethylamino thiaxanthene compound together with an excess of N-(β-hydroxyethyl)-piperazine at a temperature above 100° centigrade to cause conversion of said starting dimethylamino thiaxanthene compound to 2-chloro-9-[3' - N - (N' - β-hydroxyethyl)-piperazinylpropylidene]-thiaxanthene.

References Cited in the file of this patent

UNITED STATES PATENTS

| | | |
|---|---|---|
| 2,951,082 | Sprague et al. | Aug. 30, 1960 |
| 2,957,880 | Rometsch | Oct. 25, 1960 |
| 3,046,283 | Engelhardt | July 24, 1962 |

FOREIGN PATENTS

| | | |
|---|---|---|
| 1,044,103 | Germany | Nov. 20, 1958 |

OTHER REFERENCES

Hellman et al.: Chemische Berichte (1957), vol. 90, pp. 50 to 53.

Noller: Chemistry of Organic Compounds, 2nd Ed., pages 354 to 357, W. B. Saunders and Co. (Philadelphia) (1957).

Houben-Weyl: "Methoden der Organischen Chemie," 4th Ed., Band XI/1 (Stickstoff-verbindungen II), pages 248–261 and 266. Geroge Thieme Verlag-Stuttgart, Germany (1957).

Bonvicino et al.: J. Org. Chem., vol. 26, pages 2383–2392 (July 1961).

UNITED STATES PATENT OFFICE
CERTIFICATE OF CORRECTION

Patent No. 3,149,103                          September 15, 1964

Povl Viggo Petersen et al.

It is hereby certified that error appears in the above numbered patent requiring correction and that the said Letters Patent should read as corrected below.

Column 4, line 48, after "Formula I" insert a comma; line 58, for "is" read -- in --; column 5, line 38, for "-allylthiaxanthene" read -- allyl-thiaxanthene --; line 63, for "alkyl surfaces" read -- alkyl sulfates --; column 6, line 3, for "if illustration" read -- of illustration --; column 7, line 25, for "Piperazinylpropylidene]" in italics, read -- Piperazinylpropylidene]- --, in italics.

Signed and sealed this 16th day of February 1965.

(SEAL)
Attest:

ERNEST W. SWIDER                          EDWARD J. BRENNER
Attesting Officer                             Commissioner of Patents